(12) United States Patent
Axten et al.

(10) Patent No.: US 11,097,488 B2
(45) Date of Patent: Aug. 24, 2021

(54) PRINTER HAVING PRINT ASSEMBLY

(71) Applicant: Hewlett-Packard Development Company, L.P., Spring, TX (US)

(72) Inventors: Bruce A. Axten, Camas, WA (US); Thomas Griffiths, Brush Prairie, WA (US); Matthew A. Shepherd, Vancouver, WA (US); Thieu X. Dang, Camas, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/495,179

(22) PCT Filed: Jun. 6, 2017

(86) PCT No.: PCT/US2017/036127
§ 371 (c)(1),
(2) Date: Sep. 18, 2019

(87) PCT Pub. No.: WO2018/226211
PCT Pub. Date: Dec. 13, 2018

(65) Prior Publication Data
US 2020/0108599 A1    Apr. 9, 2020

(51) Int. Cl.
*B29C 64/393*    (2017.01)
*B29C 64/00*    (2017.01)
(Continued)

(52) U.S. Cl.
CPC ............ *B29C 64/393* (2017.08); *B29C 64/00* (2017.08); *B33Y 30/00* (2014.12); *B41J 2/04505* (2013.01); *B41J 2/04586* (2013.01)

(58) Field of Classification Search
CPC ....... B29C 64/393; B29C 64/00; B29C 64/20; B33Y 30/00; B33Y 50/02; B41J 2/04505; B41J 2/04586
(Continued)

(56) References Cited

U.S. PATENT DOCUMENTS 5,676,475 A    10/1997    Dull
6,819,448 B2    11/2004    William et al.
(Continued)

FOREIGN PATENT DOCUMENTS

WO    WO-2015011475 A1    1/2015

OTHER PUBLICATIONS

Fresenious Vial S.A., "Technical Manual Master PCA," available at http://www.frankshospitalworkshop.com/equipment/documents/infusion_pumps/service_manuals/Fresenius_Master_PCA_-_Service_Manual.pdf , 1998, 47 pages.

*Primary Examiner* — Huan H Tran
*Assistant Examiner* — Alexander D Shenderov
(74) *Attorney, Agent, or Firm* — HP Inc. Patent Department (57) ABSTRACT

A printer and method having a print assembly movable over a print zone, and a controller associated with the print assembly. The printer is capable to receive a second print assembly with an associated second controller. The first controller positions the first print assembly over the print media and to position the second print assembly over the print media. The first controller directs the first print assembly in printing. The second controller to direct the second print assembly in printing.

15 Claims, 6 Drawing Sheets

(51) Int. Cl.
*B33Y 30/00* (2015.01)
*B41J 2/045* (2006.01)

(58) Field of Classification Search
USPC .......................................................... 347/14
See application file for complete search history.

(56) References Cited

U.S. PATENT DOCUMENTS

| | | |
|---|---|---|
| 7,978,372 B2 | 7/2011 | Walmsley et al. |
| 2008/0211883 A1 | 9/2008 | Yamashita et al. |
| 2012/0223988 A1 | 9/2012 | Matsuura |
| 2016/0107383 A1* | 4/2016 | Dikovsky ............. B29C 64/106 |
| | | 264/401 |
| 2016/0311159 A1* | 10/2016 | Spanier ................ B29C 64/106 |

* cited by examiner

PRINTER HAVING PRINT ASSEMBLY

BACKGROUND

Printers may be a two-dimensional (2D) printer or a three-dimensional (3D) printer. Printers may eject liquid through nozzles for printing with the liquid to give a printed product. The nozzles may be on a printhead or printbar, and the like. The printer may control positioning of the printhead or printbar over a print zone or print media during printing, and control the ejection of print liquid through the nozzles. Some 3D printers do not eject or employ print liquid.

BRIEF DESCRIPTION OF THE DRAWINGS

Certain examples are described in the following detailed description and in reference to the drawings, in which.

DETAILED DESCRIPTION OF SPECIFIC EXAMPLES

Printers generally employ a print assembly. A print assembly may be, for example, a printhead or printbar. Further, a printer may employ multiple print assemblies. Printers such as 2D printers may employ multiple printheads to supply print liquid such as ink, pigments, colorants, and so on, to the print media or paper for printing. As for 3D printers, multiple printbars in a printer may be employed to supply print liquid such as fusing agents and other print agents/liquids to the print media or build material. The multiple print assemblies for a printer may be mounted as one single electrical contact to a single controller such as a printed circuit assembly (PCA).

Most or all data and control may be routed through this one PCA. Yet, in consideration, for example, of support by application-specific integrated circuits (ASICs), a dedicated PCA may be implemented for each print assembly of the multiple print assemblies in a printer. Thus, the implementation generally involves coordination among the respective dedicated PCAs. In some instances, most or all control for multiple print assemblies may be routed to the same controller, e.g., a PCA.

The one controller handling most or all data control may be more complex or different in electronics than the remaining controllers. That may mean additional cost on the one controller to support optional print assemblies with respect to ejection of print liquid. Also, multiple different base electronics may be implemented for a given printer which can increase cost generally because of multiple sets of electronics. In other words, the single controller handling all control may be different in base electronics than the controller for a single print assembly.

An ASIC might be employed for each print assembly. As indicated, cost may be a consideration. For instance, the incorporation of multiple ASICs for multiple print assemblies to the single or main PCA may mean burdening a printer with a more expensive PCA. For example, for two variations of a same model of printer, one printer with one print assembly, and the other printer with two print assemblies, the first printer may be burdened with a PCA having two ASICs to support multiple print assemblies even though only one ASIC (and one print assembly) is employed. An alternative is to create different PCAs (single-ASIC PCA, two-ASIC PCA, etc.) for each print assembly which again may increase cost. Moreover, using a single PCA for multiple print assemblies may reduce scalability.

In response, examples herein may synchronize the servicing and use of multiple printbars in a printing device. One example is a printer including a first print assembly and second print assembly each operationally movable over a print zone or print media. A first controller positions the first print assembly over the print media and positions the second print assembly over the print media. The first controller also directs the first print assembly to eject liquid to the print media for printing with the liquid. However, a second controller directs the second print assembly to eject liquid to the print media for printing with the liquid. The first controller may instruct the second controller when to eject liquid to print.

In some examples, multiple print assemblies may be optionally added into a printing device and coordinated through the first controller or main controller, e.g., a main PCA, that can control the positioning of the print assemblies to media. As discussed below, some specific implementations may scale well. Moreover, examples may reduce cost and provide ease-of-use with a single or more focused controller for print assemblies. A single code set or reduced number of code sets may be employed for a printer. The code set may the set of code that may run on the processor on the first controller or main PCA. In embedded systems, this code may be referred to as firmware.

To have a single image of firmware may reduce development cost because of generally less effort to manage one image for development than two images. One savings may be with respect to qualification because of typically less effort to test a single image that performs two actions than to test two images that each perform a single action. This may be increasingly true where the functionality of the second image is a subset of the first image.

In certain examples for a printer having multiple print assemblies, a relationship of a main controller for the first print assembly to the non-main or minor controllers for additional print assemblies may be established. Moreover, in one example, the first print assembly is only for monochrome printing and has an associated controller that is the main controller. The second print assembly is for color printing, and a minor controller associated with the second print assembly controls only ejection, e.g., via pins, nozzles, etc., of print liquid from the second print assembly for color printing. In that example, the minor controller may control little else or nothing else. This may allow the minor controller and the second print assembly to be no-load option, thereby in some instances reducing cost to a mono printer to support color add-on. In one example, the first controller is a master PCA and the second controller is a slave PCA, where the slave PCA only controls a color pen and nothing else. This allows the slave PCA and the second print assembly to be a no-load option, thereby limiting initial cost to a mono printer to support color add-on.

However, a print assembly or printbar can have multiple nozzle rows each capable of printing with a different kind of liquid. The printbar does not have to be limited to monochrome or color. Moreover, there may be functionality in addition to monochrome or color, such as a print liquid as detailing agents ejected through the nozzles. A secondary printbar could add additional functionality, such as printing with colored fusing agents or colored inks, or with different kinds of detailing agents, conductive agents, or transforming agents, and so on.

As for the controllers, the present techniques may define and organize actions of the controllers. In some examples, the main controller is a coordinator of most or all print and service activities of the printer. In certain examples, the main controller employs an input/output (I/O) technique which may be, for instance, serial over peripheral component interconnect express (PCIe), or multipath I/O (MPIO), and the like, to send a command list, such as a simplified command list, to the minor controller(s). While an implementation may have only one extra print assembly (a second print assembly) and one minor controller, examples herein may be scalable to multiple additional print assemblies and respective non-main controllers. Additional print assemblies and associated non-main controllers for a total of more than two print assemblies may be added, for example, to support more types of print liquid such as ink, black inks, color inks, fusing agents, metallic inks, etc.

Furthermore, in a particular example, the minor controller may contain the same code image as the main controller, as indicated in the discussion above. If so, a nonvolatile memory (NVM) object may instruct the minor controller to behave as a minor controller. This may further reduce cost by having only one code image, as also indicated. The NVM can be, for example, electrically erasable programmable read-only memory (EEPROM) where the data or object is persistent after power is removed.

In operation for some examples, the main controller, e.g., a PCA, may send commands to the minor controller(s) and then query the minor controller(s) until the minor controllers complete the action. The command may instruct the minor controller, e.g., a PCA, when to start ejection of print liquid for printing. The minor controller may respond complete to the subsequent query when the ejection is complete. The main controller may then coordinate movement of the print assemblies for additional positions to eject print liquid.

In examples, the main controller and minor controller(s) receive a page or layer of data to print. The "page" may be a 2D printer term in that a page may be data to be printed on a physical sheet of media. In 3D, the equivalent may be a "layer," as the 3D printer may print layer-by-layer. In some cases, multiple passes (e.g., four passes) of data may be implemented for a single layer. Moreover, the data received and processed by the main controller and minor controllers may be characterized as image data and may pertain to a pass of the print assemblies dispensing liquid over the media. Moreover, again, there may be multiple "images" sent per page or layer. An "image" may apply to a layer in 3D, a physical page in 2D, an individual pass of a multi-pass layer in 3D, an individual pass of a multi-pass page in 2D, and so on.

The minor controller may process the print data or image data, and then wait for commands from the main controller. The main controller, when ready, may send a command to minor controller(s) instructing to prepare-to-print. Once the minor controller(s) become ready, the main controller queries may return a "ready" from the minor controller. The main controller may then start mechanical devices such as motors to move print assemblies to perform a print operation. Note that in one implementation, the encoder signal from one of these motors may be routed to the main controller and any minor controllers. This encoder may drive, for example, the ASIC block that fires ejection of the nozzles. In other words, this encoder signal may be used by the ASIC block to fire print-liquid ejection of the nozzles on the print assemblies. The main controller may then send a command to the minor controller(s) when the minor controller should complete printing. Examples may combine use of the encoder and the first controller/second controller commands and responses for printing, servicing such as spitting, etc. Moreover, the commands, responses, positioning, and so on, may be performed in parallel and not as separate serial steps.

In some examples, as discussed below, scalability may be promoted in the adding of an additional print assembly to a printer. Moreover, as also discussed below, monochrome printing may be assigned to one print assembly in a particular example, allowing the remaining print assemblies of the printer to be idle during monochrome printing. Indeed, in an example of a printer with two print assemblies, a single print assembly may be for monochrome printing and both print assemblies may be for color printing. In other words, a printer may have a single print assembly for both monochrome and color printing, and a second print assembly for color printing. In other examples, a printer may have only one print assembly and which may be employed for both monochrome and color printing. A second print assembly for color, and associated controller, may be added. In the printer retrofit, the initial controller may be the main controller and the added controller may be a non-main controller. Other configurations and functionality are applicable. A print assembly may be flexible to employ color or monochrome printing depending on the available print liquid or print-liquid delivery system of the printer. Also, the print assemblies may encompass other functionality of print liquid such as detailing agents or other print liquids for finishing, and so forth.

As discussed, examples of the present techniques may provide for synchronizing the servicing and use of multiple print assemblies in a printing device. Again, the optional addition of a print assembly into a printer or printing device may be facilitated and coordinated through a main controller that can direct positioning of the print assemblies to the print media in the print zone. As mentioned, some implementations may scale well and provides a relatively low-cost approach.

In sum, examples of the present techniques are directed to a printer having multiple print assemblies. A print assembly may be a printbar, a printhead, or other type of print assembly. A print assembly may have nozzles to eject liquid for printing an object. The technique may address control and synchronization of the multiple print assemblies. In some examples, the printer includes a first print assembly and a second print assembly. The printer may have a first controller that directs the first print assembly to eject the print liquid. The first controller may also position the first print assembly and the second print assembly during printing. The positioning may be over a print zone and with respect to a print media such as paper, build powder, etc.

The printer includes a second controller that directs the second print assembly to eject print liquid. In certain examples, the first controller and second controller may be the same or similar in base electronics. Further, in one example, the first print assembly is for monochrome printing and the second print assembly employed for color printing. Thus, in that example, the second controller and the second print assembly may be idle during monochrome printing.

Lastly, the printer may have more than two print assemblies and associated controllers. For instance, in the above examples, the printer may include a third print assembly and an associated third controller, and in which the first controller directs the position of all three print assemblies during printing.

Figure 1:
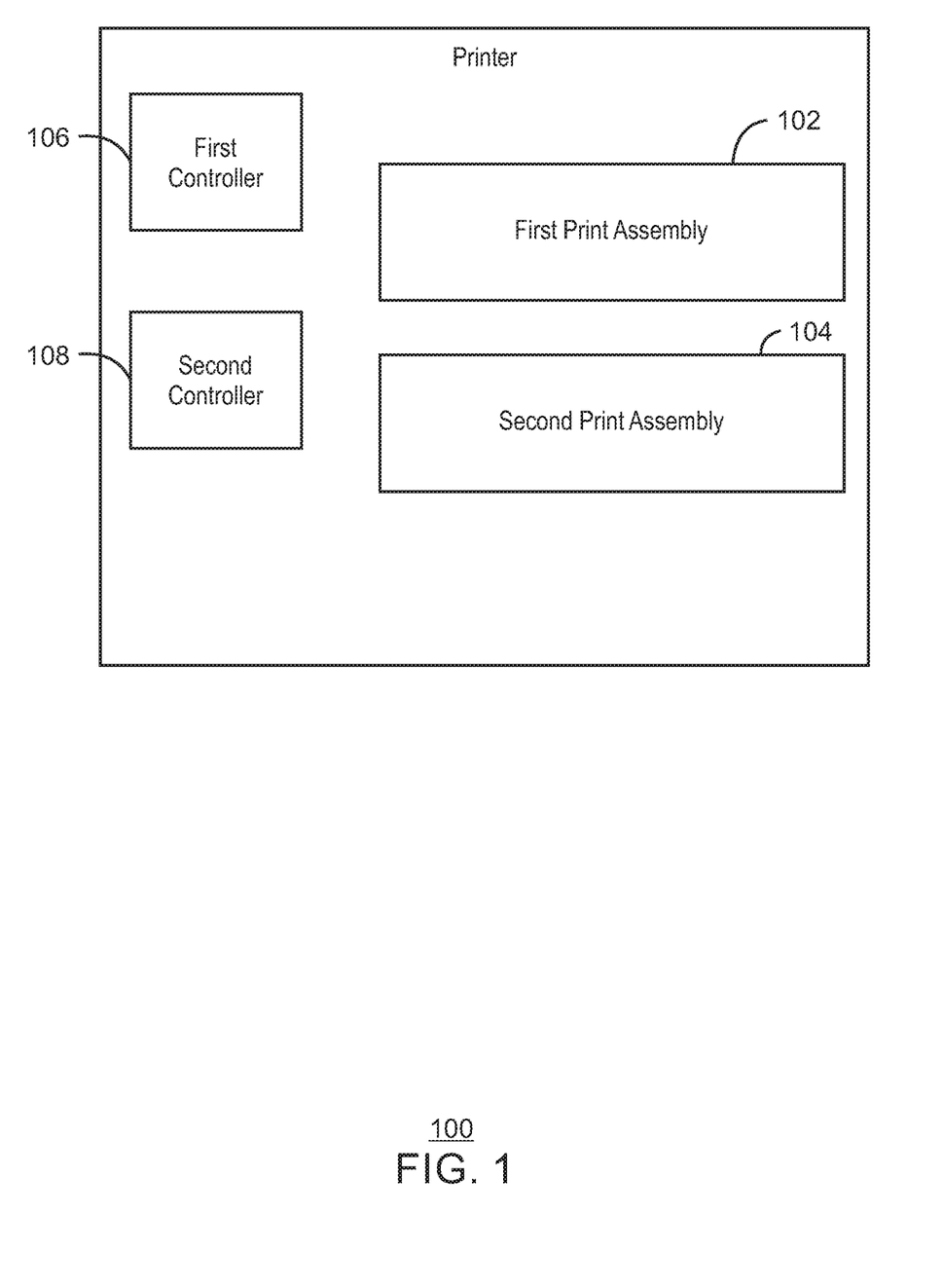
FIG. 1 is a block diagram of a printer in accordance with examples.

FIG. 1 is a printer 100 having a first print assembly 102 and a second print assembly 104. The first print assembly 102 and the second print assembly 104 each may be a printhead, printbar, or other type of print assembly. Further, the first print assembly 102 and the second print assembly 104 may each include multiple print nozzles to eject print liquid through the nozzles. The print liquid may be ejected to a print media for printing. In examples, the first print assembly 102 and the second print assembly 104 are each operationally movable over a print zone having the print media for printing. Indeed, each print assembly 102, 104 may be moved to multiple different positions over the print zone for the printing.

In addition, the printer 100 includes a first controller 106 and a second controller 108. In the illustrated example, the first controller 106 controls the ejection of print liquid from the first print assembly 102 such as to the print media during printing. Further, the first controller 106 also controls position of both print assemblies 102 and 104 over the print media. Thus, the first controller 106 may be characterized, for example, as a main or principal controller.

The second controller 108 controls ejection of print liquid from the second print assembly 104 such as to the print media during printing. In this example, the second controller 108 generally does not position the second print assembly 104 over the print media. Indeed, in one example, the second controller 108 may not control position, including printing positions, service positions, etc., of the second print assembly 104. Thus, in this example, the second controller 108 is not a main or principal controller, at least with respect to controlling position of a print assembly.

Examples of controllers 106, 108 may include a processor, microprocessor, central processing unit (CPU), memory storing code executed by the processor, an integrated circuit, an ASIC, a printed circuit board (PCB), a PCA or printed circuit board assembly (PCBA), a printer controller card, a field-programmable gate array (FPGA), or other types of circuitry. Firmware may be employed. Firmware may be code embedded on the controller such as programmed into, for example, read-only memory (ROM) or flash memory. Firmware may be instructions or logic for the controller hardware and may facilitate control, monitoring, data manipulation, and so on, by the controller.

Moreover, the printer 100 may also include, or be conditioned or capable to receive, additional print assemblies and associated controllers. Indeed, the printer 100 may have more than two print assemblies. In a particular example, the printer 100 may be capable to receive or has a third print assembly and associated controller in addition to the two print assemblies 102, 104 and controllers 106, 108 depicted. In that example, the additional associated controller (a third controller) as a non-principal controller directs the ejection of print liquid from the third print assembly. The first controller 106 as a main or primary controller controls the positions of all three print assemblies over the print zone or print media during printing. The first controller 106 may also control servicing positions of the three print assemblies. In one example, the first controller 106 is a master PCA, the second controller 108 is a slave PCA, and the third controller is a slave PCA. Additional controllers for additional print assemblies may also be a slave PCA in that example.

In summary, the first controller 106 controls ejection of print liquid from the first print assembly 102. The first controller 106 also controls the positions of both print assemblies 102, 104 over the print zone or print media during printing. The first controller 106 may send a command to the second controller 108 to eject print liquid when the second print assembly 104 is in position for printing. The second controller 108 controls the ejection of print liquid from the second print assembly 104. The first controller 106 may query the second controller 108 for completion of the ejection of liquid from the second print assembly 104. After such completion, the first controller 106 may move the second print assembly 104 to a different position over the print zone or print media for the next ejection of print liquid from the second print assembly 104.

The first controller 106 may also coordinate other actions with the second controller 108. For example, the first controller 106 may also control positions of both print assemblies 102, 104 for servicing such as in interaction of the print assemblies 102, 104 with a service station of the printer. For instance, when the pens or nozzles of the second print assembly are to spit liquid for servicing, the first controller 106 may position the second print assembly 104 above, for example, a spit surface or spittoon, and send a command to the second controller 108 to spit. After the first controller 106 receives acknowledgement from the second controller 108 that spitting by the second print assembly 104 has completed, the first controller 106 may, for example, move the second print assembly 104 to a position for the nozzles to be wiped, and so forth.

Thus, examples of the techniques may synchronize the two controllers 106, 108, e.g., print controller cards. The first controller 106 may control most or all mechanical motion and synchronizes with the second controller 108. The first controller 106 may also interact with other minor controllers for additional print assemblies. Further, as discussed below, there may be an extra controller such as formatter, that sends print data to the first controller 106 and the second controller 108. In certain examples, the first controller 106 does not have knowledge of the print data sent to the second controller 108.

In a particular example with the first controller 106 as a master PCA and the second controller 108 as a slave PCA, the master PCA controls the position of all print assemblies including print assemblies 102, 104. The master PCA does not know anything of the slave PCA printing, except to communicate to the slave PCA that the second print assembly 104 is in position for printing. Again, an additional controller, such as a formatter, print data card, etc., may be a third PCA that sends print data to the master and slave PCA's.

Moreover, for some examples, the printer 100 does not include the depicted second print assembly 104 and second controller 108 but instead is capable to receive the second print assembly 104 and second controller 108. In other words, the printer 100 may be manufactured or assembled with the first print assembly 102 and the first controller 106, and the printer 100 conditioned to receive the second print assembly 104 and second controller 108 later. In certain examples, the printer 100 with the first print assembly 102 and the first controller 106 is placed into operation and performs printing. The printer 100 then later receives as an add-on the second print assembly 104 and second controller 108. In a particular example, a printer 100 as a monochrome printer with one print assembly (the first print assembly 102) is placed into operation performing monochrome printing, and then later upgraded by adding the second print assembly 104 and second controller 108 to perform color printing. Again, the printer 100 is capable to receive the second print assembly 104 and second controller 108. In addition to the second print assembly 104, the printer 100 may have a print-liquid delivery system for additional print liquids for color printing.

Lastly, some 3D printers may not eject or use print liquid. In that case, the print assembly 102 or 104 may include an energy source, such as a laser, to apply energy to build material, such as build powder, to sinter the build material to print or form a 3D object layer-by-layer. Indeed, in some examples, the print assemblies 102 and 104 may not include nozzles but instead each include an energy source to emit energy to melt, fuse, or sinter build material (e.g., powder) for 3D printing. For example, the energy source may emit a laser for selective laser sintering (SLS), or emit an electron beam for electron beam melting (EBM), and so on. A reason to have two energy sources, e.g., to have two print assemblies 102 and 104 each having an energy source, may be for performance or other reasons. Another example is selective heat sintering (SHS) in which multiple print assemblies each having a thermal printhead are employed to fuse build material or powder in a build bed of material such as on a build platform. In one example, two thermal printheads are employed.

Thus, some examples of 3D printers may have multiple print assemblies without nozzles, and in which print nozzles or print liquid (e.g., fusing agents) are not employed. As for the controllers in these examples, the first controller 106 as a main or master controller may control the print position of both energy sources, e.g., control position of each print assembly 102 and 104 having the respective energy source. The second controller 108 as a minor or slave controller may control energy (e.g., laser, heat, etc.) output from the second print assembly. The second controller 108 could control energy output from both the first print assembly 102 and the second print assembly 104. Other control configurations are applicable.

Figure 2:
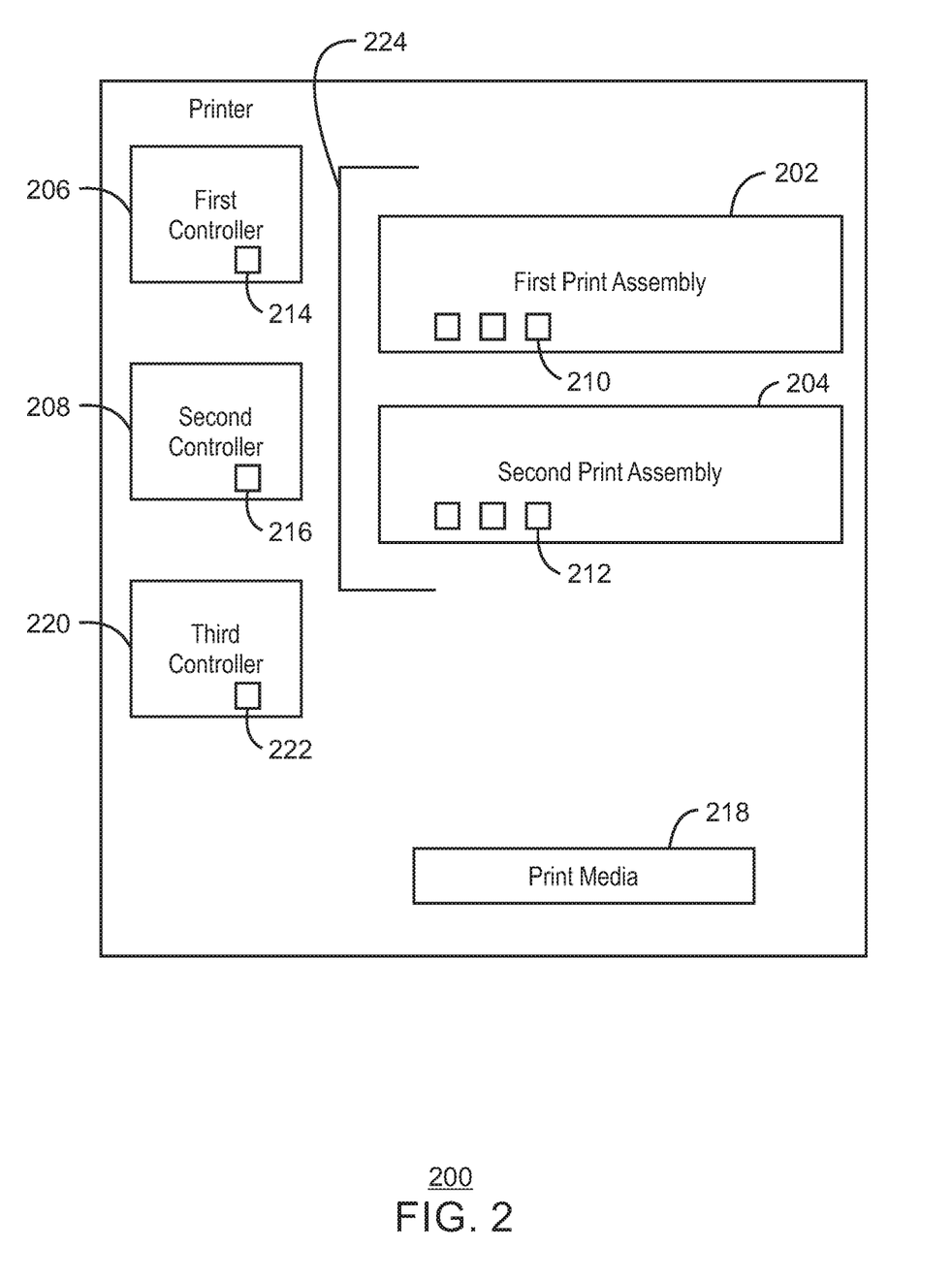
FIG. 2 is a block diagram of a printer in accordance with examples.

FIG. 2 is a printer 200 having a first print assembly 202 and a second print assembly 204. The first print assembly 202 and the second print assembly 202 may each be a printhead, printbar, or other type of print assembly. The printer 200 may be a 2D printer or a 3D printer.

For some examples of printer 200 as a 3D printer to print a 3D object, the printer 200 may eject print liquid through the nozzles of the print assemblies 202, 204 onto print-media material such as powder, and apply light or heat to the ejected liquid and powder mixture to form the 3D object layer-by-layer from the material. The 3D printer may have a light source or heat source to apply the light and/or heat to each layer. The light source or heat source may be heat lamps, infrared light source, etc. As used herein, a light source may be considered or called a heat source for instances such as with infrared (IR) light. In certain examples, fusing lamps are employed and may be labeled as a light source or a heat source.

As used herein, the term "powder" as build material can, for example, refer to a powdered material which may be layered and bound via a binding material during a print job of a 3D printing process. The powdered material can be, for example, a powdered semi-crystalline thermoplastic material, a powdered metal material, a powdered plastic material, a powdered composite material, a powdered ceramic material, a powdered glass material, a powdered resin material, and/or a powdered polymer material, among other types of powdered material. Lastly, while the discussion herein may focus at times on 3D printing, it should be emphasized that examples of the techniques described with respect to control of print assemblies apply to 2D printers.

As with the printer 100 of FIG. 1, the printer 200 of FIG. 2 includes a first controller 206 and a second controller 208. The first controller 206 controls the ejection of print liquid from the first print assembly 202. Further, in some examples, the first controller 206 controls position, including the operating position, of both print assemblies 202 and 204. Thus, the first controller 206 may be labeled as main controller, principal controller, chief controller, leading controller, major controller, primary controller, master controller, and the like. Yet, the first controller 206 may not have a traditional master/slave relationship with the secondary controller 208 with respect to specifying the ejection of print liquid from the second print assembly 204. Indeed, in this example, the second controller 208 receives print data independent of the first controller 206. The second controller 208 controls ejection of print liquid from the second print assembly 204.

As indicated, in an example, the second controller 208 generally does not direct movement or positioning of the second print assembly 204. Thus, in that example, the second controller 208 is not a principal or main controller, at least with respect to controlling operating position of a print assembly. Thus, the second controller 208 may be labeled as a non-main controller, minor controller, secondary controller, subordinate controller, slave controller, underling controller, acolyte controller, and the like.

The first print assembly 202 may include multiple print nozzles 210 to eject print liquid. Likewise, the second print assembly 204 may include multiple print nozzles 212 to eject print liquid. In some examples, the nozzles 210, 212 if employed, may reside on, or be a component of, substructures on the print assemblies 202, 204. The substructures may be, for example, dies, pins, printheads, or other substructures. Moreover, the number of print nozzles 210 or 212 can be up to hundreds or thousands, or more. In one example, the number of print nozzles 210 or 212 is less than 500 nozzles. In another example, the number of print nozzles 210 or 212 ranges from 10,000 nozzles to 70,000 nozzles.

The diameter of the print nozzles 210, 212 can be as small as 70 microns or less. The diameter can be 5 microns, 10 microns, 15 microns, 30 microns, or 50 microns, or any values therebetween. In one example, the nozzle diameter is in a range of 5 microns to 30 microns. The diameter can be greater than 70 microns. The print liquid may include ink, colorant, pigment, carrier, dye, thermoplastic, fusing agent, detailing agent, or other material. In one example, the printer 200 is a 3D printer, the print liquid includes a fusing agent, and the first and second print assemblies 206, 208 are printbars each having at least 30,000 print nozzles 210, 212.

The ejection of the print liquid through the nozzles 210 and 212 may be via pressure differential, a pump, thermal or heat, heating elements, thermal bubble or bubble jet, piezoelectric, and so on. If heating elements are employed, the heating elements may be resistors in some examples. The piezoelectric technique may include piezo crystals with the application of voltage or current.

Furthermore, the controllers 206, 208 may include firmware or code 214, 216, e.g., instructions, logic, etc., stored in memory and executed by a processor to implement their respective control functions discussed herein. If firmware is employed, the firmware may provide for interaction between code and hardware, including to interpret commands and provide for control generally. The firmware configuration may be unique to a printer or given controller, incorporating properties of the printers and respective controller.

As mentioned, the first controller 206 may direct or control the ejection of print liquid from the nozzles 210 of the first print assembly 202 such as to a print media 218 during printing. In addition, the first controller 206 as a master or main controller may direct or control position of both print assemblies 202 and 204 in or over a print zone having the print media 218 during printing. In the illustrated example, the second controller 208 may control or direct ejection of print liquid from the nozzles 212 of the second print assembly 204 to the print zone or print media 218 during printing. The first and second print assemblies 202 and 204 are positioned, respectively, over a print zone. The print media 218 may be disposed in the print zone.

In some examples, a third controller 220 may provide print data 222 to the first controller 206 and to the second controller 208 for printing. As discussed above, first controller 206 or main controller and the second controller 208 or minor controller(s) may receive a page of data for 2D printing or layer of data for 3D printing. In some cases, multiple passes (e.g., four passes) of data may be implemented for a single page or single layer. Moreover, the data received and processed by the controllers may be characterized as image data and may pertain to a pass of the print assemblies 202, 204 dispensing liquid onto the print media 218. Moreover, again, there may be multiple "images" per page or layer. An "image" may apply to a layer in 3D, a physical page in 2D, an individual pass of a multi-pass layer in 3D, an individual pass of a multi-pass page in 2D, and so forth.

Further, the first print assembly 202 and the second print assembly 204, and any additional print assemblies, may reside in or on a movement device 224 such as a carriage or other positioning apparatus. The printer 200 may have a motor(s) to move the carriage. The first controller 206 may direct movement of the carriage 224 to position the print assemblies. One or more carriages 224 may also carry movable components such as an energy source, heat lamps, a powder spreader or powder spreading arm, and other devices. Moreover, as mentioned, printer 200 control may combine use of an encoder signal and commands/responses by the first controller 206 and the second controller 208 for printing, servicing such as spitting, and so on. Furthermore, the commands, responses, positioning, and so on, may be performed in parallel in examples.

Lastly, some examples of the printer 200, as well as some examples of the printer 100 of FIG. 1 and the printer 300 of FIG. 3 discussed below, may be a 3D printer that prints or forms a 3D object via the print liquid. In certain examples, the print liquid may be ejected from the nozzles 210, 212 to the print media 218, and in which the print media 218 may be a build bed having build material including powder such as plastic powder or metal powder. In one example, the powder is Nylon powder. In another example, the powder is metal powder such as stainless steel powder. In general, some examples of the printer 100, 200, 300 may lay the print liquid on the powder. An energy source such as an IR light source may melt powder in a combination of the powder and the print liquid to sinter or fuse the powder. Indeed, the energy from the energy source applied to the print liquid on the build material may facilitate greater incorporation of energy into the powder where the print liquid is applied, or facilitate reaction of the print liquid with the powder, and the like, for the printer 100, 200, 300 to form the 3D object.

The 3D object may be formed layer-by-layer, e.g., layers of about 80 microns in thickness. As indicated, in one example, the print liquid does not necessarily react with the powder to fuse or solidify the powder. Instead, the selectively-applied print liquid on the powder provides for greater absorption of heat or light by the powder with the print liquid than the remaining powder without print liquid. Further, the print liquid may include detailing agents to further refine the 3D object.

Thus, for certain examples, the printer 100, 200, 300 may print or fabricate a 3D solid object. The solid object may be a product which may be a full product, a part of a product, a prototype, and so on. The 3D printing may make 3D solid objects from a digital file. An object may be created by laying down successive layers of build material until the object is created. In some instances, each of these layers can be seen as a thinly sliced horizontal cross-section of the eventual object.

Figure 3:
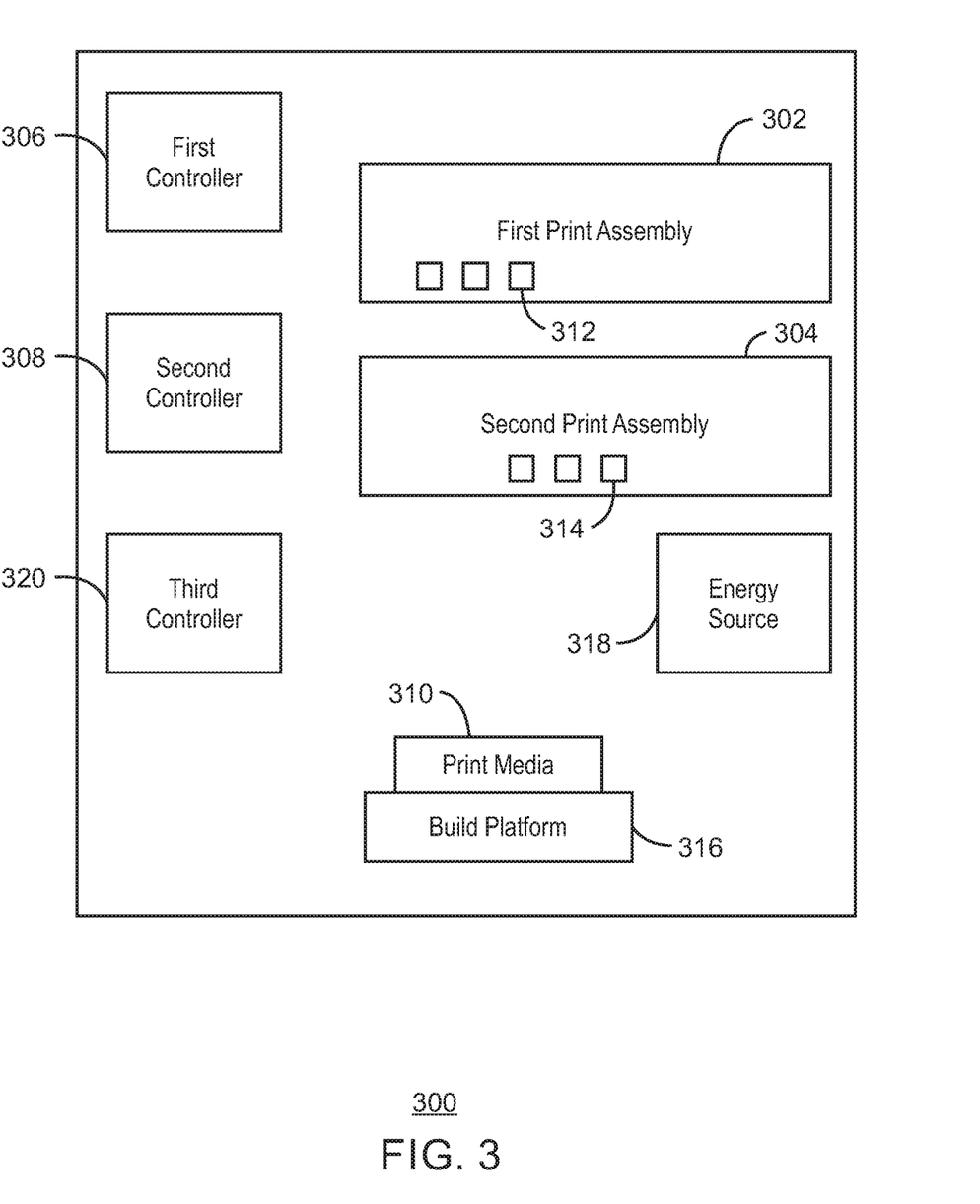
FIG. 3 is a block diagram of a 3D printer in accordance with examples.

FIG. 3 is a 3D printer 300 having a first print assembly 302 and a second print assembly 304 which may each may be printbars. The printbars may be operationally movable during printing to different respective print positions. Further, a first controller 306 is associated with the first print assembly 302. As with some examples discussed above with respect to the preceding figures, the first controller 306 controls ejection of print liquid from the first print assembly 302 to the print media 310. The first controller 306 also controls the respective positions of the first print assembly 302 and the second print assembly over the print media 310 during printing. The second controller 308 controls ejection of print liquid from the second print assembly 304 to the print media 310. As used herein, the print media 310 on which printing is applied may be in a print zone of the printer 300. Thus, positioning of the print assemblies 302 and 304 may be over a print zone during printing. Similarly, ejection of print liquid to the print media 310 may be ejection of print liquid to the print zone.

In certain examples, the print media 310 is build material and which may be build powder or include build powder. The 3D printer 300 may employ nozzles 312, 314 to eject print liquid onto the print media 310 to print a product or 3D object. The first controller 306 controls ejection of print liquid through nozzles 312 of the first print assembly 302 to the print media 310. The second controller 308 controls ejection of print liquid through nozzles 314 of the second print assembly 304 to the print media 310.

The print media 310 or build material may reside on a build platform 316. To perform 3D printing, the 3D printer 300 may have a build enclosure with the build platform 316. The build enclosure may be a build chamber, build bucket, and the like. The 3D printer may print or form, via the build platform 316, the 3D object from build material and print liquid on the build platform 316. For example, in operation, a build bed of material as print media 310 may be disposed on the build platform 316 and in which print liquid may be applied, and powder fused or sintered layer-by-layer to form the 3D object. Again, the build material may be or include powder. As defined herein, build material may include powder(s) and powder-like materials. The powder may be plastic, polymer, metal, ceramic, glass, concrete, composite material, or other powders.

The 3D printer 300 may include an energy source 318 which may be a light source, heat source, heat lamps, a combined light/heat source, etc. The energy source 318 may apply energy, such as light, heat, IR light/heat, UV light, etc., to the print media 310, e.g., build material, and the print liquid ejected onto the print media 310. In certain examples, the energy source 318 is operationally movable, and the printer 300 positions the energy source 318 during printing.

The energy source(s) 318 may be operationally movable, stationary or static, or a combination thereof. Moreover, it should be noted that the energy source 318 may be a light source to apply light but is a heat source in a sense that an effect of applying the light, e.g., IR light, is that heat is applied. Therefore, in that example, the energy source 318 may be called a heat source or light source.

To generate the 3D object, the 3D printer 300 may form via the build platform 316 successive layers with the build material under computer control to fabricate the 3D object. As indicated, a model and automated control may facilitate the layered manufacturing and additive fabrication. The model may be, for example, a computer aided design (CAD) model or similar model. Moreover, as mentioned, the build material may include powder and with portions of the powder as melted, fused, solidified, etc. to form the layer. The 3D objects so formed can be various shapes and geometries, and produced via the model such as a 3D model or other electronic data source. The 3D printing and fabrication by the 3D printer 300 may involve sintering, melting, fusing, or fusion of the material or powder by energy sources 316 such as a laser, electron beam, light, ultraviolet (UV) light, heat, and so forth. Indeed, this may involve laser melting, laser sintering, electron beam melting, fused deposition or fusion, and so on. In some examples, a category of 3D printing involves binding in which properties of the liquid(s) add strength for handling to subsequently sinter such as with respect to build material including metals or ceramics, or to infiltrate as in the case of gypsum binding 3D printing, and the like. The 3D printing may involve other additive manufacturing (AM) printing techniques.

As for product applications, the 3D printer 300 may fabricate objects as prototypes or products for aerospace (e.g., aircraft), machine parts, medical devices (e.g., implants), automobile parts, fashion products, structural and conductive metals, ceramics, conductive adhesives, semiconductor devices, and other applications. In one example, the printer 300 forms mechanical parts which may be metal or plastic, and which may be equivalent or similar to mechanical parts produced, for example, via injection molding.

In a particular example, such as with thermal fusion or fused deposition, light or heat from the energy source 318 may be applied to the print liquid ejected from the nozzles 312, 314 onto the build powder to fuse powder at specific points each layer to form the 3D object. In certain instances, the heat and/or light applied to the print liquid may facilitate reaction of the print liquid with the powder. On the other hand, the heat and/or light applied may facilitate absorption of heat or light by the powder to give, for example, fusion of desired portions of the powder on each layer. The desired portions of powder fused may be where the print liquid is applied. Indeed, specific points or areas of print liquid application to the build bed, and with light or heat applied, may be driven by computer control such as under direction of a 3D model. In some examples, the build platform 316 resides on a movement device, e.g., a piston, that is incrementally lowered as the 3D object is formed layer-by-layer. After completion of the print job, the 3D object may be removed from the 3D printer 300. In examples, the 3D object may be subjected to additional processing, such as post-processing, finishing, and so forth.

The 3D printer may include a computer system having a hardware processor and memory. The hardware processor may be a microprocessor, central processing unit (CPU), an ASIC or other circuitry, printer control card(s), and the like. The processor may be one or more processors, and may include one or more cores. The memory may include volatile memory such as random access memory (RAM), cache, and the like. The memory may include non-volatile memory such as a hard drive, read only memory (ROM), and so forth. The computer system may include code, e.g., instructions, logic, etc., stored in the memory and executed by the processor to direct operation of the printer 300 and to facilitate various techniques discussed herein with respect to control, and so on.

The printer 300 may include an additional controller or third controller 320 that may be a formatter, print data card, or other circuitry to provide print data to the first controller 306 and the second controller 308. The print data may be used by the first controller 306 to control the ejection of print liquid from the nozzles 312 of the first print assembly 302. Likewise, the second controller 308 may rely on the print data to control ejection of print liquid from the nozzles 314 of the second print assembly 304. Therefore, in some examples, the second controller 308 is not slave to the first controller 306 with respect to print data and controlling of ejection of print liquid. While the first controller 306 may control positioning of the second print assembly 304 for printing, the printing via ejection of liquid through the nozzles 314 is controlled by the second controller 308.

As mentioned, the first and second print assemblies 302, 304 may each be a printbar in the illustrated example. In some examples, the nozzles 312, 314 may be a component of substructures on the print assemblies 302, 304 or printbars. The substructures may be, for example, dies, pins, printheads, or other substructures, on the printbars. Lastly, as mentioned, examples of the present techniques with respect to control of multiple print assemblies (e.g., printbars, printheads, energy sources, other print assemblies) are applicable to both 2D printers and 3D printers.

Figure 4:
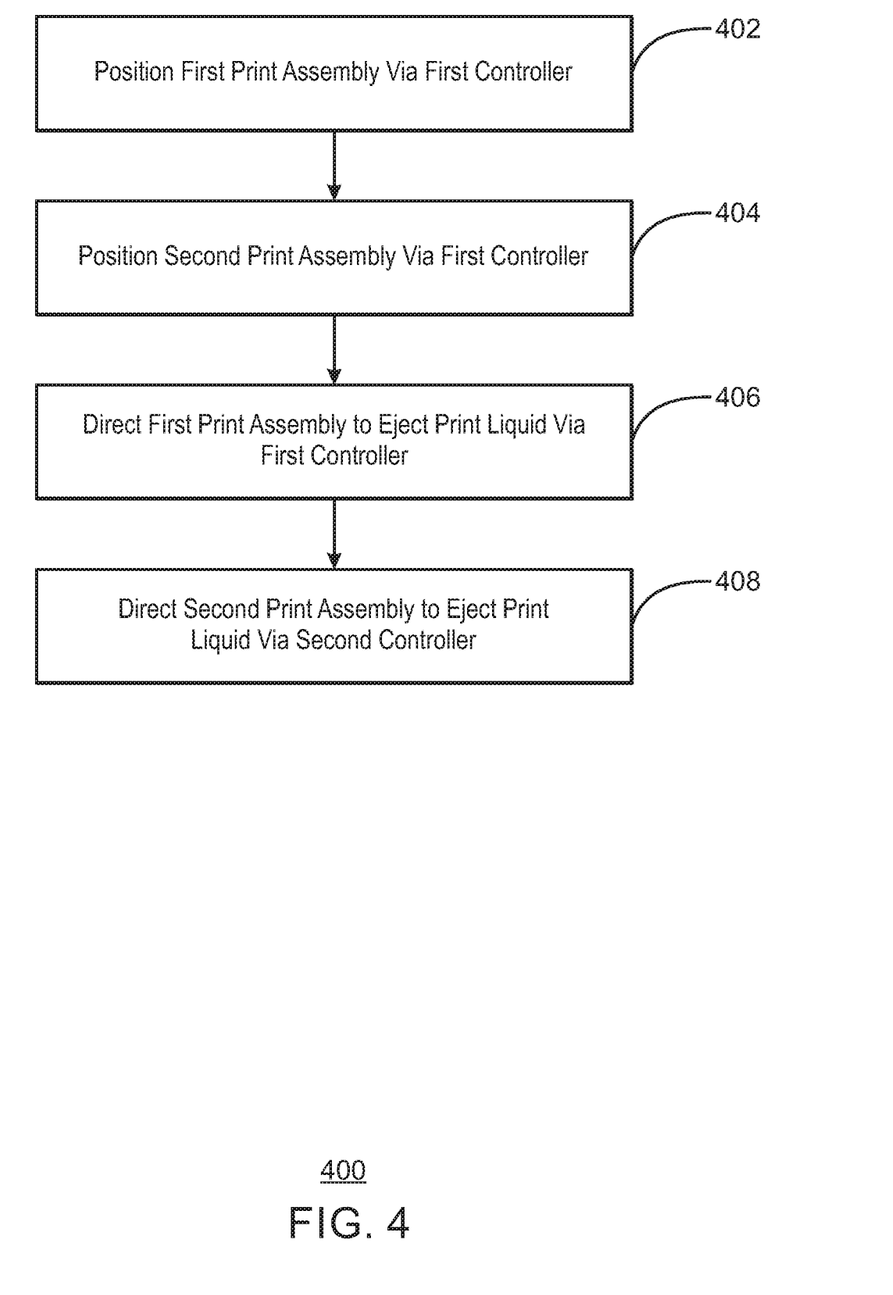
FIG. 4 is a block flow diagram of a method of operating a printer in accordance with examples.

FIG. 4 is an example method 400 of operating a printer to print an object. The printer may be a 2D printer or a 3D printer. In one example of a 2D printer, the print liquid includes ink and the print media is paper. In an example of a 3D printer, the print liquid includes components to fuse material on a build platform of the printer. The build material may be powder such as polymer powder or metal powder, and so on. Examples of print liquid in 3D printing may include fusing agents, colorants, detailing agents, and the like.

In the example method 400 of FIG. 4, the printer includes at least two print assemblies. Each print assembly is operationally movable over the print media to print the object. Moreover, in a particular instance, the first print assembly may be for both monochrome printing and color printing, wherein the second print assembly is for color printing and not for monochrome printing. However, in other examples, the second print assembly may be employed for monochrome printing.

In addition, the printer includes a first controller associated with the first print assembly and a second controller associated with second print assembly. In one instance, the first controller and the second controller each are a PCA or PCBA. The printer may include additional controllers dedicated to additional print assemblies beyond the two print assemblies. Further, circuitry or cards other than a PCA or PCBA may be employed as the controllers.

Furthermore, as discussed below, the first controller controls positions of both the first assembly and the second print assembly during printing, such as positioning over a print zone or over print media. Additionally, the first controller may also control positions of both the first and second print assemblies in servicing, such as positioning with respect to a service station of the printer. The control of other positions of the print assemblies may be applicable.

At block 402, the method includes positioning, via the first controller, the first print assembly over the print media. In other words, the positioning may involve controlling, via the first controller, movement of the first print assembly to multiple positions over the print media. The positioning over the print media may involve positing over a print zone of the printer.

At block 404, the method includes positioning, via the first controller, the second print assembly over the print media. This positioning of the second print assembly may involve controlling, via the first controller, movement of the second print assembly to multiple positions over the print media. The one or more positions of the second print assembly over the print media for printing the object may be different than the one or more positions of the first print assembly for printing the object.

Moreover, at least one movement component such as one or more carriages or positioning devices may be employed to move the first print assembly and the second print assembly. In some examples, positioning (block 402) the first print assembly includes positioning, via a carriage and the first controller, the first print assembly over the print media. Further, positioning (block 404) the second print assembly may include positioning, via the carriage and the first controller, the second print assembly over the print media. The same carriage may be employed to move both print assemblies. In other examples, different respective carriages are employed. Further, the carriage(s) may also include build-material delivery or spreading system, a energy source such as heat lamps, and so on. A controller such as the first controller may be involved controlling positions of a carriage(s) with respect to the additional systems and components.

At block 406, the method includes directing, via the first controller, the first print assembly to eject print liquid onto the print media. The first controller may control ejection of print liquid from nozzles of the first print assembly to the print media. Moreover, the first controller may receive print data and control the ejection of the print liquid from the first print assembly based on the print data.

At block 408, the method includes controlling or directing, via the second controller, the second print assembly to eject print liquid onto the print media during printing, wherein the second controller is different than the first controller. The second print assembly may eject print liquid from print nozzles of the second print assembly to the print media, wherein the second controller controls ejection of the print liquid through the print nozzles from the second print assembly. While the second controller may have the same or similar hardware or basic electronics configuration as the first controller, the second controller is an additional or separate controller.

In operation, the first controller as the main controller may send a command to the second controller instructing to prepare-to-print. Once the second controller becomes ready, the first controller queries may return a "ready" from the second controller. The first controller may then start mechanical devices such as motors or carriages to move print assemblies for a print.

Thus, the second controller may receive an instruction or command from the first controller as to when the second controller is to initiate printing with the second print assembly. After the first controller has positioned the second print assembly for printing, the first controller may command the second controller to start ejection of print liquid from the second print assembly. As for the ejections by the second print assembly, the second controller may receive print data from another controller such as a formatter or print data controller. The second controller controls ejection of the print liquid from the second print assembly based on the print data received by the second controller.

Again, the second controller may receive the print data for the second print assembly from a third controller such as a formatter. In some examples, the first controller is not aware of the print data sent to the second controller. In one example, the first controller does not direct and is not informed of the specifics of the printing or ejections by the second print assembly, except for the first controller to instruct the second controller to initiate printing when the second print assembly is in position. The first controller may query the second controller to determine when the printing (ejection of print liquid) by the second print assembly is complete. The second controller may respond informing the first controller of completion of the printing by the second print assembly. For printing a 3D object layer-by-layer, the various foregoing actions may be repeated each layer.

In some examples, the first print assembly is a first printbar having print nozzles to eject the print liquid to the print media, and the second print assembly is a second printbar having print nozzles to eject the print liquid to the print media. The print media may be build material or build powder. As indicated, the first controller positioning the first printbar may involve positioning the first printbar in a first position over the print media to print the object and also positioning the first printbar in a second position over the print media different than the first position to print the object. Likewise, the first controller may position the second printbar to multiple positions over the print media to print the object. For forming a 3D object, multiple positions per printbar per layer may be implemented.

Furthermore, with the example of the printer as a 3D printer and the print assemblies as printbars, the method 400 may include applying light or heat to print liquid ejected onto the print media. The application of such energy may be to facilitate absorption of heat by the print media at selected points or areas of the print media (e.g., build powder) where the print liquid is applied. Those selected areas of the build powder may fuse or sinter to form that layer of the 3D object. Indeed, the 3D object being printed may be formed layer-by-layer. The application of the light or heat may also facilitate reaction of the print liquid with the print media to fuse or sinter the print media in some examples.

Lastly, as indicated, the method 400 may include providing, via a third controller, print data to the first controller and to the second controller. The printer may include this extra controller as third controller that may be a formatter, print data card, or other circuitry to provide print data to the first controller and the second controller. The print data may be used by the first controller to control the ejection of print liquid from the nozzles of the first print assembly. Likewise, the second controller may use the print data in the control of ejection of print liquid from the nozzles of the second print assembly. Thus, as discussed for certain examples, while the second controller may be labeled as a "slave" with respect to, for instance, the first controller instructing the second controller when to initiate printing with the second print assembly, the second controller is generally not a slave in printing ejection of liquid for the second print assembly. Indeed, in those examples, the second controller (not the first controller) receives the print data for the second print assembly.

Figure 5:
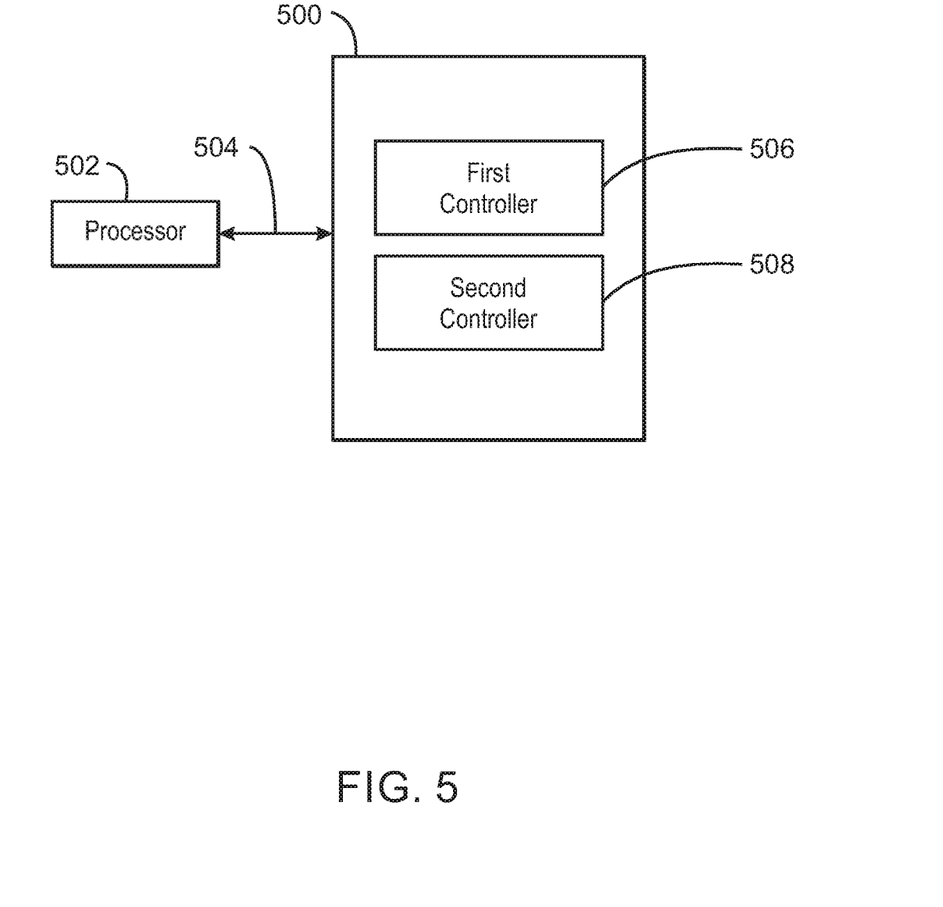
FIG. 5 is a block diagram of a computer-readable medium that may contain code to execute operation of a printer in accordance with examples.

FIG. 5 is a block diagram of a computer-readable medium 500 that may contain code for execution to implement techniques described herein with respect to printer control. The medium may be a non-transitory computer-readable medium 500 that stores code that can be accessed by a processor 502 such as via a bus 504. For example, the computer-readable medium 500 may be a volatile or non-volatile data storage device. The medium 500 may also be a logic unit, such as an ASIC, FPGA, or an arrangement of logic gates implemented in one or more integrated circuits.

Again, the medium 500 may store code, e.g., instructions, logic, firmware, etc., executable to facilitate the techniques described herein. For example, a first controller code 506 may facilitate a first controller of a printer to receive print data and to control ejection of print liquid through nozzles of a first print assembly based on the print data. The first controller code 506 may also direct the first controller to control respective positions of the first print assembly and a second print assembly over a print zone or print media. Further, a second controller code 508 may provide for a second controller to receive print data and control ejection of print liquid from nozzles of the second print assembly based on the print data.

The first controller code 506 may direct the first controller to instruct the second controller when to initiate ejection of print liquid from the second print assembly for printing. Also, the first controller code 506 when executed may provide for the first controller to query the second controller regarding completion of the second print assembly ejecting print liquid. The second controller code 508 may provide for the second controller to so respond. In addition, the first controller code 506 may give additional functions such as for the first controller to direct positions of the both the first and second print assemblies in servicing such as with respect to a service station of the printer.

An example of a non-transitory, computer readable medium for a printer incudes machine-readable instructions, that when executed, direct a processor to direct a first processor to control position of a first print assembly over a print media, control position of a second print assembly over the print media, and control ejection of print liquid from the first print assembly. The control of position over the print media may be to control position over a print zone of the printer. The instructions when executed direct a second processor to control ejection of print liquid from the second print assembly. The printer may be a 2D printer. The printer may be a 3D printer, wherein the print media includes build material having powder, wherein the first print assembly is a first printbar having print nozzles to eject the print liquid, and wherein the second print assembly is a second printbar having print nozzles to eject the print liquid.

Figure 6:
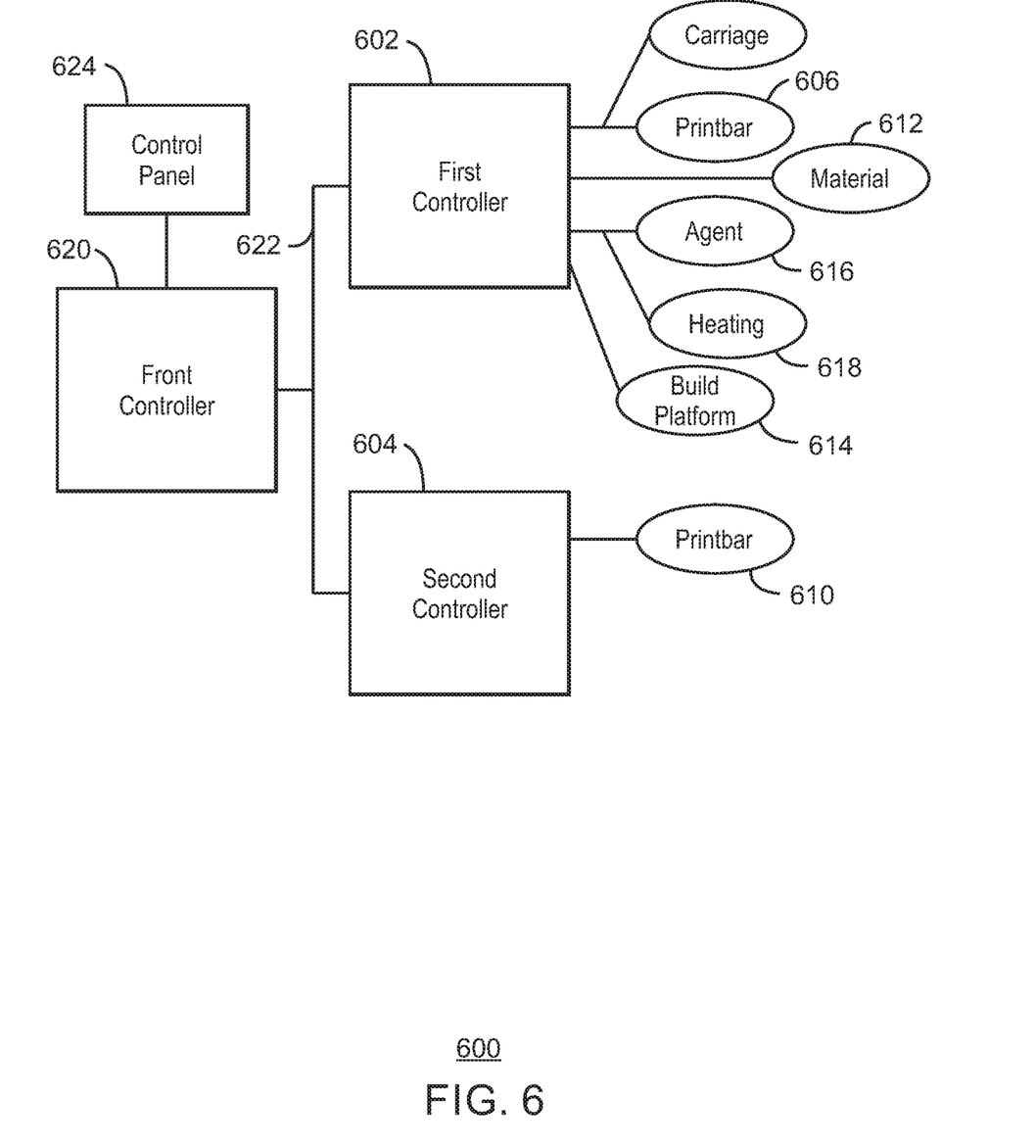
FIG. 6 is a diagram of a printer control scheme in accordance with examples.

FIG. 6 is an example control scheme 600 of printer. In certain examples, the printer is a 3D printer. The printer includes a first controller 602 and a second controller 604. In some examples, the controllers 602 and 604 are PCAs, PCBAs, or printer controller cards. The first controller 602 controls a first printbar 606 of the printer, such as with respect to ejection of print liquid for printing. The second controller 604 controls the second printbar 610 such as with respect to ejection of print liquid for printing.

The first controller 602 also controls a printer carriage 608 that positions both the first printbar 606 and a second printbar 610 over a print zone such as over a print media or build material for printing. The first controller 602 may also control the carriage 608 to position both printbars 606 and 610 for servicing such as with a service station of the printer. The control of the carriage 608 may involve, for example, control of motor(s), a carriage axes system, and so on.

The first controller 602 may also control a material delivery system 612 of the printer. The control may involve the first controller 602 interacting with a controller of the material delivery system 612. The material may include print media, paper, build material, build powder, and so on. The material delivery may be by gravity, conveying systems, vibration, hoppers, delivery devices, spreading arms, and so on.

The first controller 602 may control or interact with a controller of a build platform system 614 on which print media or build material is disposed to form a printed object. In some examples for 3D printing, the build platform may be lowered incrementally to fabricate the 3D object layer-by-layer.

The first controller 602 may control an agent delivery system 616 to provide agents for printing. The control may be for the first controller 602 to interact with a controller of the agent delivery system 616. Agents may include ink, colorants, pigments, fusing agents, detailing agents, and the like.

Lastly, the first controller 602 may control or interact with a controller of a heating system 618. The heating system 618 may include light sources, heat sources, heat lamps, or other energy sources. The heating system 618 may apply light or heat to print media or build material, and to agents ejected onto the build material.

In the illustrated example, the control scheme 600 may include a front controller 620 to send print data 622 to the first controller 602 and to the second controller 604. The front controller 620 may be communicatively coupled to the first controller 602 and the second controller 604 via PCIe or other protocol. As indicated above in discussion of preceding figures, the front controller 620 may be an extra controller, a third controller, formatter, print data card, or other circuitry, and so on. In one example, the front controller 620 may be a third PCA that sends print data 622 to first the first and second controllers 602 and 604 which are a master PCA and a slave PCA, respectively. In some examples, the first controller 602 as a principal or main controller is not aware of the print data 622 sent to the second controller 604 as a minor or non-principal controller.

In operation, the first controller 602 as the main controller may send a command to the second controller 604 instructing to prepare-to-print. Once the second controller 604 becomes ready, the first controller 602 queries may return a "ready" from the second controller 604. The first controller 602 may then start mechanical devices such as motors for the carriage 608 to move the second printbar 610 for a print. Thus, the second controller 604 may receive an instruction or command from the first controller 602 as to when the second controller 608 is to initiate printing with the second print assembly. After the first controller 602 has positioned the second print assembly 610 for printing, the first controller 602 may command the second controller 604 to start ejection of print liquid from the second print assembly.

A printer control panel 624 may include a computer system to incorporate the direction of a 3D model for the computer system and the front controller 620 to generate the print data 622. The model may be "sliced" in preparation for the layer-by-layer printing. Digital data may be obtained from electronic data sources other than a model.

The model or other electronic source may provide digital 3D design data for the printer to build a component or product in layers by depositing material and including fusion, sintering, melting, deposition, solidification, etc., of portions of the material. Such 3D printer or additive manufacturing (AM) may be in contrast, for example, to milling a workpiece from solid block. The AM 3D printer relying on the model may build the product layer-by-layer employing materials, for instance, in powder form. A range of different metals, plastics, and composite materials may be used. Unlike subtractive manufacturing techniques that start with a solid block of material and then cut away the excess to create a finished part, AM may build a part, or features onto parts, layer-by-layer from geometry described in a 3D design model. Of course, subtractive manufacturing, e.g., subtractive machining, may be employed in conjunction with AM or 3D printing in certain examples.

An example includes a printer having a first print assembly operationally movable over a print zone, and a second print assembly operationally movable over the print zone. Thus, the first print assembly and second print assembly may be operationally movable over a print media in the print zone. The printer includes a first controller to position the first print assembly over the print zone or print media, direct the first print assembly in printing, and position the second print assembly over the print zone or print media, and a second controller to direct the second print assembly in printing. The print assemblies may be a printbar or printhead, or a combination thereof.

Other examples includes a first print assembly operationally movable over a print zone, wherein the printer is capable to receive a second print assembly operationally movable over the print zone. The printer includes a first controller to position the first print assembly over the print zone, direct the first print assembly in printing, and position the second print assembly over the print zone, wherein the printer is capable to receive a second controller to direct the second print assembly in printing. The printer may receive and include the second print assembly and the second controller.

For directing the first print assembly in printing, the first controller may direct the first print assembly to eject liquid to print media in the print zone for printing with the liquid. For directing the first print assembly in printing, the second controller may direct the second print assembly to eject liquid to the print media for printing with the liquid. In certain examples, the first print assembly may include or be a first printbar having print nozzles. Likewise, the second print assembly may include or be a second printbar having print nozzles. Further, the first controller to position the first printbar may include to position the first printbar in a first position over the print media to eject liquid for printing and to position the first printbar in a second position over the print media to eject liquid for printing, the second position different than the first position. Indeed, the first controller may direct movement of the first printbar to multiple positions over the print zone for printing. The first controller may also direct movement of the second printbar to multiple positions over the print zone for printing during the same print job.

In some examples, the printer is a 3D printer and includes an energy source. The print media may be build material. The printer may employ the energy source to apply light or heat, or both, to liquid ejected onto the build material to facilitate heating the build material at points where the liquid is applied to form a 3D object layer-by-layer in printing.

The printer may include a third controller to provide print data to the first controller and to the second controller. Moreover, in a particular example, wherein the first print assembly performs monochrome printing and the second print assembly performs color printing, wherein the second print assembly may be idle during monochrome printing. In one example, the first controller and the second controller each are or include a PCA or PCBA. Again, the first print assembly and the second print assembly may each be or include a printhead or printbar, or other type of print assembly.

While the present techniques may be susceptible to various modifications and alternative forms, the examples discussed above have been shown by way of example. It is to be understood that the technique is not intended to be limited to the particular examples disclosed herein. Indeed, the present techniques include alternatives, modifications, and equivalents falling within the true spirit and scope of the appended claims.

What is claimed is:

1. A printer comprising:
  a first print assembly operationally movable over a print zone and controlled by a first controller, wherein the printer is capable to receive a second print assembly operationally movable over the print zone and a second controller to direct the second print assembly in printing;
  the first controller to:
    position the first print assembly over the print zone;
    direct the first print assembly in printing; and
    position the second print assembly over the print zone; and
  the second controller to receive image data and direct the second print assembly in printing responsive to the received image data, wherein the second controller is to initiate printing in response to instructions from the first controller.

2. The printer of claim 1, comprising the second print assembly and the second controller.

3. The printer of claim 1, wherein the first controller to direct the first print assembly in printing comprises the first controller to direct the first print assembly to eject liquid to print media in the print zone for printing with the liquid, and wherein the second controller to direct the second print assembly in printing comprises the second controller to direct the second print assembly to eject liquid to the print media for printing with the liquid.

4. The printer of claim 3, wherein first print assembly comprises a first printbar having print nozzles, wherein the second print assembly comprises a second printbar having print nozzles, wherein to position the first printbar comprises to position the first printbar in a first position over the print media to eject liquid for printing and to position the first printbar in a second position over the print media to eject liquid for printing, the second position different than the first position.

5. The printer of claim 4, comprising an energy source, wherein the printer comprises a three-dimensional (3D) printer, wherein the print media comprises build material, and wherein the energy source to apply light or heat, or both, to liquid ejected onto the build material to facilitate heating the build material at points where the liquid is applied to form a 3D object layer-by-layer in printing.

6. The printer of claim 1, comprising a third controller to provide print data to the first controller and to the second controller, wherein the first print assembly to perform monochrome printing and the second print assembly to perform color printing, wherein the second print assembly is idle during monochrome printing, wherein the first controller and the second controller each comprise a printed circuit assembly (PCA) or a printed circuit board assembly (PCBA), wherein the first print assembly and the second print assembly each comprise a printhead or printbar.

7. A method of operating a printer to print an object, comprising:
   positioning, via a first controller, a first print assembly over a print media;
   positioning, via the first controller, a second print assembly over the print media, wherein the first print assembly and the second print assembly are operationally movable over the print media to print the object;
   directing, via the first controller, the first print assembly to eject print liquid onto the print media; and
   receiving, at a second controller, image data and directing, via the second controller, the second print assembly to eject print liquid onto the print media responsive to the image data, wherein the second controller is different than the first controller and wherein the second controller is to initiate printing in response to an instruction from the first controller to initiate printing.

8. The method of claim 7, wherein the first print assembly comprises a first printbar having print nozzles to eject the print liquid, wherein the second print assembly comprises a second printbar having print nozzles to eject the print liquid, wherein positioning the first printbar comprises positioning the first printbar in a first position over the print media to print the object and positioning the first printbar in a second position over the print media different than the first position to print the object.

9. The method of claim 8, comprising applying light to print liquid ejected onto the print media to fuse powder, wherein the printer comprises a three-dimensional (3D) printer, wherein the print media comprises build material comprising the powder, and wherein the object comprises a 3D object formed layer-by-layer.

10. The method of claim 7, providing, via a third controller, print data to the first controller and to the second controller, wherein the first print assembly is for monochrome printing and color printing, wherein the second print assembly is for color printing and not for monochrome printing, wherein the first controller and the second controller each comprise a printed circuit assembly (PCA) or a printed circuit board assembly (PCBA).

11. The method of claim 7, wherein:
   positioning the first print assembly comprises controlling, via the first controller, movement of the first print assembly to a first plurality of positions over the print media; and
   positioning the second print assembly comprises controlling, via the first controller, movement of the second print assembly to a second plurality of positions over the print media.

12. The method of claim 7, wherein:
   directing the first print assembly comprises the first print assembly ejecting print liquid from print nozzles of the first print assembly to the print media, wherein the first controller controls ejection of the print liquid from the first print assembly; and
   directing the second print assembly comprises the second print assembly ejecting print liquid from print nozzles of the second print assembly to the print media, wherein the second controller controls ejection of the print liquid from the second print assembly.

13. The method of claim 7, wherein:
   positioning the first print assembly comprises positioning, via a carriage and the first controller, the first print assembly over the print media;
   positioning the second print assembly comprises positioning, via the carriage and the first controller, the second print assembly over the print media;
   directing the first print assembly comprises controlling ejection of print liquid from the first print assembly via the first controller; and
   directing the second print assembly comprises controlling ejection of print liquid from the second print assembly via the second controller.

14. A non-transitory, computer readable medium comprising machine-readable instructions for a printer, the instructions, when executed, direct a first processor to control position of a first print assembly over a print zone, control position of a second print assembly over the print zone, and control ejection of print liquid from the first print assembly to print media in the print zone, and the instructions when executed command a second processor to start ejection of print liquid from the second print assembly to the print media wherein the second processor is to control the ejection of the print liquid based on image data received by the second controller.

15. The non-transitory, computer readable medium of claim 14, wherein the printer comprises a three-dimensional (3D) printer, wherein the print media comprises build material comprising powder, wherein the first print assembly comprises a first printbar having print nozzles to eject the print liquid, and wherein the second print assembly comprises a second printbar having print nozzles to eject the print liquid.

* * * * *